United States Patent [19]

Clark

[11] Patent Number: 5,104,273
[45] Date of Patent: Apr. 14, 1992

[54] WALL ANCHOR SOCKET APPARATUS

[76] Inventor: Arlance G. Clark, 1216 Main St., St. Joseph, Mo. 64501

[21] Appl. No.: 661,852

[22] Filed: Feb. 27, 1991

Related U.S. Application Data

[63] Continuation-in-part of Ser. No. 509,720, Apr. 16, 1990, abandoned.

[51] Int. Cl.⁵ .......................... F16B 35/00; F16L 5/00
[52] U.S. Cl. ...................... 411/366; 411/82; 411/403; 285/206; 52/704
[58] Field of Search ............ 411/82, 258, 366, 368, 411/369, 400, 407, 403, 555; 52/704, 707; 285/206, 207

[56] References Cited

U.S. PATENT DOCUMENTS

| | | | |
|---|---|---|---|
| 3,177,014 | 4/1965 | Bergstrom | 285/206 |
| 3,407,455 | 10/1968 | Metz | 411/555 |
| 3,495,307 | 2/1970 | Metz | 411/555 |
| 3,575,372 | 4/1971 | Emberson | 52/704 |
| 4,091,708 | 5/1978 | Jacobson | 411/407 |

Primary Examiner—Neill R. Wilson
Attorney, Agent, or Firm—Hovey, Williams, Timmons & Collins

[57] ABSTRACT

A wall anchor socket apparatus for use in securing a wall anchor to a wall having an opening of predetermined diameter formed therein includes a cup-shaped fitting having an open end, a closed end, an intermediate section sized for receipt within the opening, and a circumferential lip adjacent the open end and having a diameter greater than the diameter of the opening. The closed end is adapted to protrude into the opening beyond the wall by a predetermined distance when the fitting is positioned in the opening and the fitting is secured in the opening. A collar is provided having an axially extending sleeve adapted to engage the rear surface of the wall so that the wall is pinched between the lip of the fitting and the sleeve of the collar when the collar is attached to the fitting. A radially extending flange is positioned adjacent the sleeve and is adapted to provide additional holding strength of the apparatus when material is filled around the apparatus against the rear surface of the wall.

3 Claims, 2 Drawing Sheets

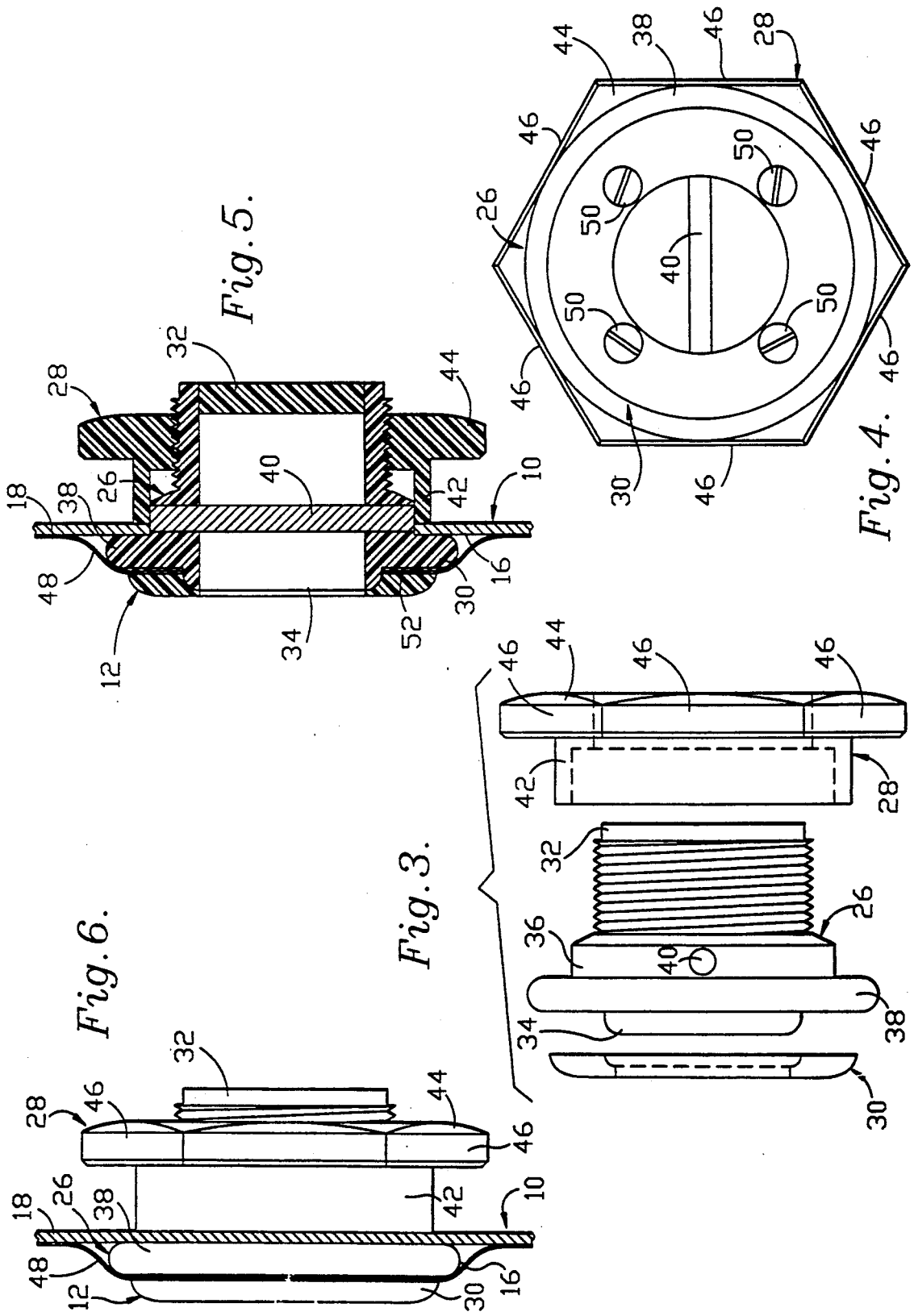

5,104,273

WALL ANCHOR SOCKET APPARATUS

RELATED APPLICATIONS

This application is a continuation-in-part of U.S. application Ser. No. 07/509,720, filed Apr. 16, 1990, now abandoned.

BACKGROUND OF THE INVENTION

1. Field of the Invention

The present invention relates generally to wall fittings and, more particularly, to a wall anchor socket apparatus including a fitting provided with a transverse pin adapted to anchor a cable, rope or the like to a wall.

2. Discussion of the Prior Art

It is known to provide a wall anchor socket apparatus for use in securing a cable or rope between a pair of opposing walls of a swimming pool in order to indicate a boundary of separation between deep and shallow portions of the pool.

According to these known constructions, the pool walls are each formed with an opening adapted to receive the wall anchor socket apparatus, and the apparatus is formed of a diameter sized to fit within the openings. Typically, the apparatus is inserted into one of the openings and held manually in place while cement or other fill materials are poured into the area immediately behind the wall and around the apparatus.

Thus, when a socket apparatus of the conventional type is installed, it is necessary for the installer to manually retain the apparatus in place until the fill material behind the wall has dried to a point sufficient to secure the apparatus relative to the wall without further manual retention efforts.

OBJECTS AND SUMMARY OF THE INVENTION

It is an object of the present invention to provide a wall anchor socket apparatus which is of relatively simple construction and which permits installation to be made without substantial manual effort.

Another object of the present invention is to provide such a wall anchor socket apparatus capable of being secured to a wall before the wall is subjected to back fill such that no need exists for the apparatus to be manually retained in position during the back fill operation.

In accordance with these and other objects, a wall anchor socket apparatus constructed in accordance with the present invention includes a cup-shaped fitting having an open end, a closed end opposite the open end, an intermediate section sized for receipt within the opening, and a circumferential lip adjacent the open end of the fitting and having a diameter greater than the diameter of the opening. The closed end is adapted to protrude into the opening beyond the wall by a predetermined distance when the fitting is positioned in the opening with the lip in contact with the front surface of the wall. Securing means are provided for securing the fitting in the opening and for holding the lip against the front surface of the wall. The securing means includes a collar having an axially extending sleeve adapted to engage the rear surface of the wall and means for gripping the closed end of the fitting so that the wall is pinched between the lip of the fitting and the sleeve of the collar.

The collar also includes a radially extending flange positioned adjacent the sleeve and defining a diameter greater than the diameter of the opening. The flange is adapted to provide additional holding strength of the apparatus when material is filled around the apparatus against the rear surface of the wall. The apparatus is provided with an annular face plate, and means for securing the face plate to the open end of the fitting. The face plate is adapted to secure a watertight liner to the fitting to render the connection between the wall anchor socket apparatus and the opening of the wall watertight.

By providing this construction numerous advantages are achieved. For example, by providing the apparatus with a collar for securing the fitting in position relative to the wall, it is possible to secure the apparatus in place within the opening before the area adjacent the rear surface of the wall is filled in with back fill or the like. Thus, it is unnecessary for an installer to manually retain the socket in position during a back fill operation.

Another advantageous result of the present construction resides in the additional holding strength obtained by providing a flange on the collar which is separated from the rear surface of the wall when the apparatus is installed so that an annular space is defined between the wall and the flange within which back fill material settles. When back fill material fills this annular space, the material acts to retain the apparatus within the opening of the wall.

BRIEF DESCRIPTION OF THE DRAWINGS FIGURES

A preferred embodiment of the wall anchor socket apparatus of the present invention is discussed in detail below with reference to the attached drawing figures, wherein:

FIG. 3 is an exploded side view of the wall anchor socket apparatus;

FIG. 4 is a front elevational view of the assembled wall anchor socket apparatus;

FIG. 5 is a side sectional view of a swimming pool wall and the wall anchor socket apparatus installed thereon; and FIG. 6 is a side elevational view of the swimming pool wall and the wall anchor socket apparatus.

DETAILED DESCRIPTION OF THE PREFERRED EMBODIMENT

Figures 1, 2:
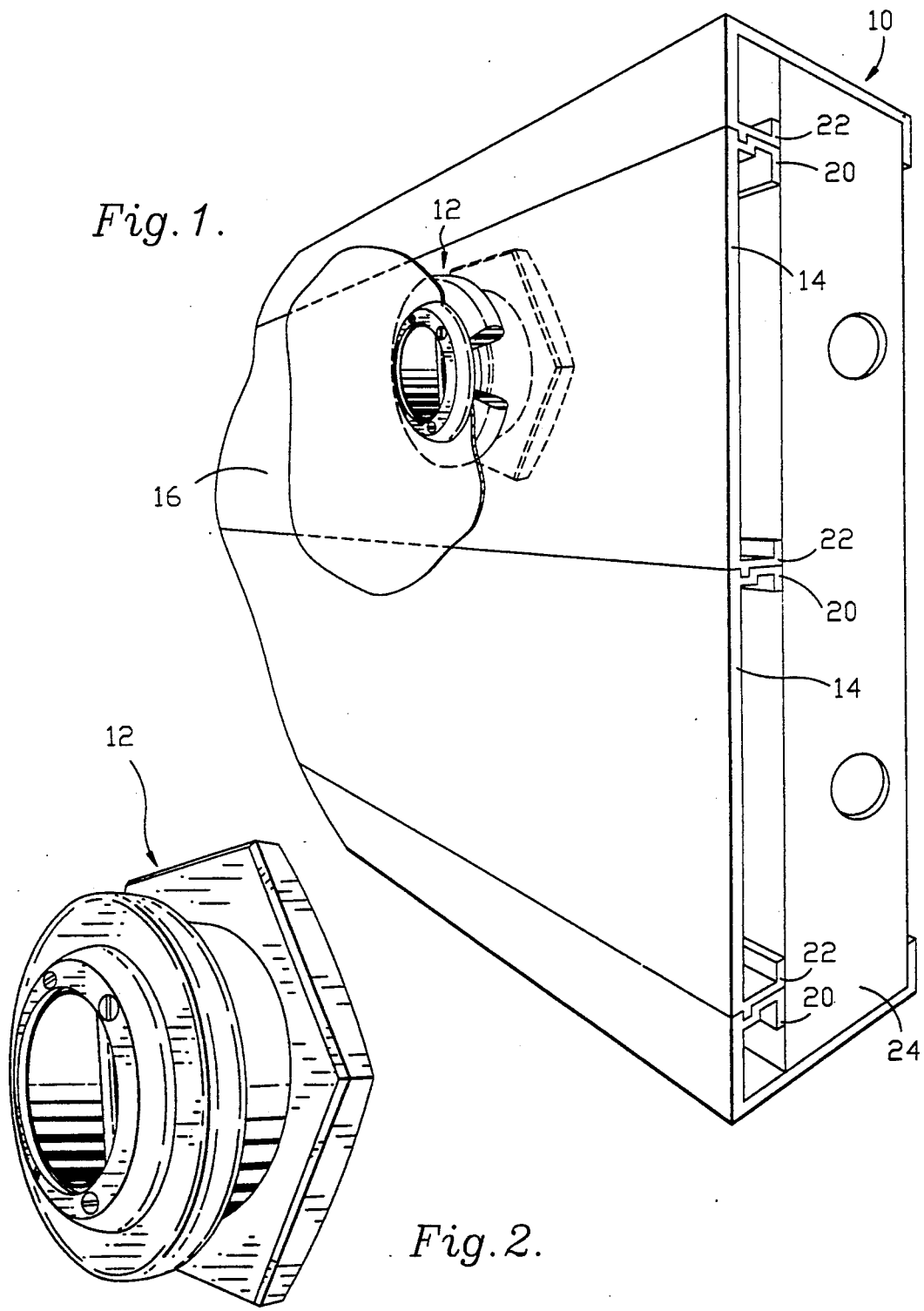
FIG. 1 is a perspective view illustrating a swimming pool wall assembly and a wall anchor socket apparatus constructed in accordance with the preferred embodiment, with the socket apparatus shown installed on the wall assembly.
FIG. 2 is a perspective view of the wall anchor socket apparatus in an assembled condition.

A swimming pool wall assembly 10 and a wall anchor socket apparatus 12 constructed in accordance with the preferred embodiment is illustrated in FIG. 1, with the socket apparatus shown installed on the wall assembly.

The wall assembly 10 is made up of a number of aluminum or metal wall panels 14 each provided with a front surface 16, a rear surface 18 opposing the front surface, and transverse longitudinally extending flanges 20, 22 adjacent upper and lower edges thereof. The panels 14 are secured together by positioning the upper flange 20 of one of the panels in contact with the lower flange 22 of an adjacent panel and securing the flanges together, such as by welding or the like. The panels 14 are thus stacked on top of one another to form a wall. A plurality of vertical supports 24 may also be secured to the wall panels 14 adjacent the rear surface 18 thereof in order to provide added rigidity to the assembly 10.

It is understood that although a wall assembly formed of aluminum panels is illustrated, it is possible to employ the wall anchor socket apparatus 12 of the present invention with wall assemblies of other constructions, such as in fiberglass installations and the like.

The wall, or one panel 14 thereof, is provided with a hole extending completely therethrough which dictates the position of the wall anchor socket apparatus 12. This opening may be formed by any conventional means.

The wall socket apparatus 12 is shown in FIG. 2, and includes three components which are illustrated in detail in FIG. 3. These components are a cup-shaped fitting 26, an annular collar 28, and an annular face plate 30. The fitting 26 is preferably formed of a nylon or plastic material and includes a closed end 32 and an open end 34 and is provided with an intermediate section 36 sized for receipt within the opening, and preferably of a diameter only slightly smaller than the diameter of the opening in the wall. The fitting 26 includes a circumferential lip 38 adjacent the open end thereof which adjoins the intermediate section 36. The lip 38 is of a diameter greater than the diameter of the opening in the wall and is adapted to rest against the front surface 16 of the wall, as shown in FIG. 5, when the apparatus is secured within the opening.

The outer surface of the fitting 26 is threaded adjacent the closed end 32 to permit engagement of the fitting by a securing means which includes the collar 28. As shown in FIG. 4, a transverse pin 40 is disposed within the open end of the fitting 26 and is adapted to receive a wall anchor of a rope or cable adapted to extend from the wall. The transverse pin 40 is secured within the open end of the fitting 26 by any conventional means, and is preferably formed of stainless steel or of any other material capable of resisting rust and providing a requisite anchoring strength.

The collar 2B includes an annular body formed of a nylon or plastic material and having a threaded inner surface adapted to engage the threaded surface of the fitting 26, and an axially extending sleeve 42 adapted to engage the rear surface 1B of the wall when the collar 28 is threaded onto the fitting 26 during installation of the apparatus.

The collar 28 also includes a flange 44 protruding radially outward from the body and extending at least partially, and preferably completely, around the circumference of the collar 28. The flange 44 includes a number of flattened surfaces 46 which may be engaged by a tool in order to permit tightening of the collar on the fitting. As can be seen from FIG. 5, the wall is pinched between the lip 38 of the fitting 26 and the sleeve 42 of the collar 28 when the collar is tightened against the wall during installation of the apparatus.

As shown in FIG. 6, an additional function carried out by the flange 44 of the collar 28 is to define an annular space between the rear surface 18 of the wall and the flange 44 which may be filled with material that will provide additional holding strength to the apparatus relative to the wall.

The face plate 30 is also formed of a nylon or plastic material and is adapted to secure a watertight liner 48, as shown in FIG. 5, to the fitting 26 to render the connection between the wall anchor socket apparatus 12 and the opening of the wall watertight. As illustrated in FIG. 4, stainless steel screws 50 may be provided as means for securing the face plate 30 to the fitting 26 and for sealing the liner 48 against the fitting in order to provide the watertight connection.

Installation of the wall anchor socket apparatus 12 within the opening in the wall is discussed with reference to FIG. 5, and includes the initial step of inserting the closed end 32 of the fitting 26 through the opening from the front surface 16 toward and past the rear surface 18 so that the intermediate section 36 is disposed at the opening and the closed end 32 is disposed behind the wall. Thereafter, the fitting 26 is rotated relative to the wall in order to locate the transverse pin 40 at a desired angular position relative to the wall, and the fitting 26 is manually supported while the collar 28 is screwed onto the closed end 32.

The collar 28 is screwed onto the fitting 26 until the sleeve 42 engages the rear surface 18 of the wall and pulls the lip 38 of the fitting firmly against the front surface 16 of the wall so that the wall is pinched between the lip and the sleeve.

Once the collar 28 has been tightened against the wall in this manner, manual support of the fitting 26 may be relieved and the fitting will remain secured to the wall. The flange 44 provided on the collar 28 is separated from the rear surface 18 of the wall and defines an annular space within which material settles during a back filling operation, wherein a back fill material, such as concrete, is poured into the area adjacent the rear surface 18 of the wall in surrounding engagement with the flange of the collar 28. Thus, the material, once hardened, prevents the collar from being moved toward the wall in a direction which would permit loosening of the apparatus.

Once the fitting 26 is secured within the opening, the liner 48, which forms a part of the wall assembly 10, is placed against the front surface 16 of the wall and over the open end 34 of the fitting 26. The face plate 30 is positioned in alignment with the open end 34 of the fitting 26 and is secured thereto through the liner 48 by inserting the plurality of stainless steel screws 50 through the face plate and the liner into preformed holes provided in the fitting, and tightening the screws so that the face plate is affixed to the fitting with the liner clamped therebetween, as shown in FIG. 4. Preferably, a rubber gasket 52 or the like may be interposed between the face plate 30 and the liner 48 in order to improve the seal therebetween. Once the face plate 30 is secured to the fitting 26 in this manner, the liner 48 is cut within the area aligned with the open end 34 of the fitting in order to expose the transverse pin 40 for attachment to the anchor of a cable or rope. By securing the liner 48 to the fitting 26 in this manner, a watertight seal is formed which prevents water from passing between the socket apparatus 12 and the wall assembly 10.

Although the present invention has been described with reference to the illustrated embodiment, it is noted that substitutions may be made and equivalents employed herein without departing from the scope of the invention as recited in the claims.

What is claimed is:

1. A wall anchor socket apparatus for use in securing a wall anchor to a wall having an opening of predetermined diameter formed therein, the wall including a front surface adapted to face the wall anchor and a rear surface opposed to the front surface and adapted to be placed in contact with a fill material after installation of the wall anchor socket apparatus, the apparatus comprising:

a cup-shaped fitting having an open end, a closed end opposite the open end, an intermediate section sized for receipt within the opening, and a circumferential lip adjacent the open end of the fitting and having a diameter greater than the diameter of the opening, the closed end being adapted to protrude into the opening beyond the wall by a predetermined distance when the fitting is positioned in the opening with the lip in contact with the front surface of the wall;

securing means for securing the fitting in the opening and for holding the lip against the front surface of the wall, the securing means including a collar having an axially extending sleeve adapted to engage the rear surface of the wall and means for securing the collar to the closed end of the fitting so that the wall is pinched between the lip of the fitting and the sleeve of the collar, the collar also having a radially extending flange positioned adjacent the sleeve and being adapted to provide additional holding strength of the apparatus when material is filled around the apparatus between the flange and the rear surface of the wall;

an annular face plate; and means for securing the face plate to the open end of the fitting, the face plate being adapted to secure a watertight liner to the fitting to render the connecting between the wall anchor socket apparatus and the opening of the wall watertight.

2. A wall anchor socket apparatus as recited in claim 1, wherein the fitting includes a transverse pin disposed within the open end of the fitting and adapted to receive a wall anchor.

3. The wall anchor socket apparatus as recited in claim 1, wherein the fitting is threaded adjacent the closed end, and the collar includes a threaded inner surface engageable with the threaded surface of the fitting to permit gripping of the fitting by the collar.

* * * * *